US012614569B2

(12) United States Patent
Huang et al.

(10) Patent No.: US 12,614,569 B2
(45) Date of Patent: *Apr. 28, 2026

(54) METHOD, APPARATUS, DEVICE, STORAGE MEDIUM AND PROGRAM PRODUCT FOR PROCESSING MULTIMEDIA DATA

(71) Applicant: Beijing Zitiao Network Technology Co., Ltd., Beijing (CN)

(72) Inventors: Zhanpeng Huang, Beijing (CN); Guangde Huang, Beijing (CN); Hengan Wu, Beijing (CN); Rongtao Yang, Beijing (CN); Ting Luo, Beijing (CN); Yihan Yang, Beijing (CN); Xuyue Han, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/923,258

(22) Filed: Oct. 22, 2024

(65) Prior Publication Data

US 2025/0046344 A1     Feb. 6, 2025

Related U.S. Application Data

(63) Continuation of application No. 18/396,140, filed on Dec. 26, 2023, now Pat. No. 12,136,444, which is a
(Continued)

(30) Foreign Application Priority Data

Jun. 30, 2022     (CN) .......................... 202210772811.8

(51) Int. Cl.
*H04N 5/91*          (2006.01)
*G11B 27/036*        (2006.01)

(52) U.S. Cl.
CPC ............. *G11B 27/036* (2013.01); *H04N 5/91* (2013.01)

(58) Field of Classification Search
None
See application file for complete search history.

(56) References Cited

U.S. PATENT DOCUMENTS 12,136,444 B2 * 11/2024 Huang ................... G11B 27/34
2013/0216206 A1 * 8/2013 Dubin .................. G11B 27/031
                                                        386/282
(Continued)

FOREIGN PATENT DOCUMENTS

CN      108024083 A      5/2018
CN      112153288 A     12/2020
(Continued)

OTHER PUBLICATIONS

International Search Report and Written Opinion received for PCT Patent Application No. PCT/CN2023/103070, mailed on Oct. 20, 2023, 8 pages (1 pages of English Translation and 7 pages of Original Document).
(Continued)

*Primary Examiner* — Eileen M Adams

(57)     ABSTRACT

The present disclosure relates to a method, apparatus, device, storage medium and program product for processing multimedia data. The method comprises: acquiring first multimedia draft data, wherein the first multimedia draft data is generated based on a segmented recording operation, video materials collected by the segmented recording operation being used to form video track segments in the first multimedia draft data; importing the first multimedia draft data into a first editor, so that the video track segments are displayed on a video editing track of the first editor; updating the first multimedia draft data in response to triggering a video editing operation for the video track segments on the
(Continued)

first editor, to obtain second multimedia draft data; and generating a target video based on the second multimedia draft data in response to a trigger operation of video synthesis.

16 Claims, 3 Drawing Sheets

Related U.S. Application Data continuation of application No. PCT/CN2023/103070, filed on Jun. 28, 2023.

(56) References Cited

U.S. PATENT DOCUMENTS

| | | | |
|---|---|---|---|
| 2014/0056576 A1* | 2/2014 | Miura .................. | H04L 65/762 |
| | | | 386/284 |
| 2021/0125640 A1* | 4/2021 | Andersson ........... | H04N 23/695 |

FOREIGN PATENT DOCUMENTS

| | | |
|---|---|---|
| CN | 112218154 A | 1/2021 |
| CN | 113411490 A | 9/2021 |
| CN | 114025087 A | 2/2022 |
| WO | 2013118505 A1 | 8/2013 |
| WO | 2019/213809 A1 | 11/2019 |

OTHER PUBLICATIONS

Non-Final Office Action mailed on Mar. 6, 2024, for U.S. Appl. No. 18/396,140, pp. 26.
Notice of Refusal for Japanese Application No. 2024-564690, mailed Apr. 22, 2025, 12 pages.
European Search Report for EP Patent Application No. 23830307.7, Issued on Jun. 17, 2025, 9 pages.

* cited by examiner

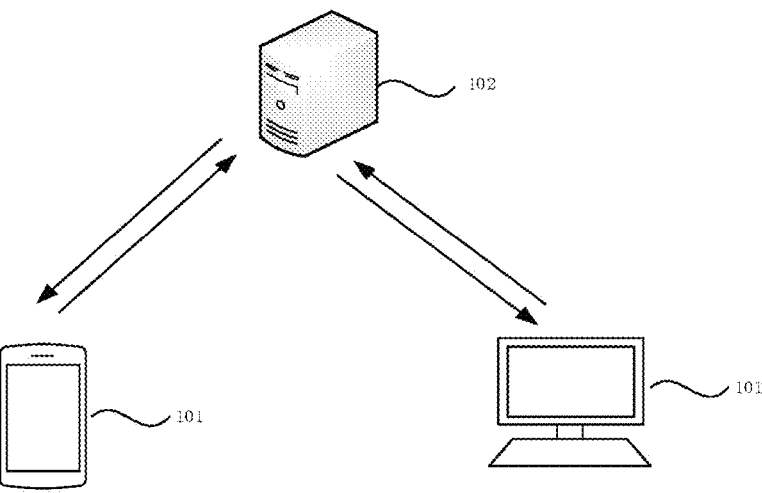

FIG.1

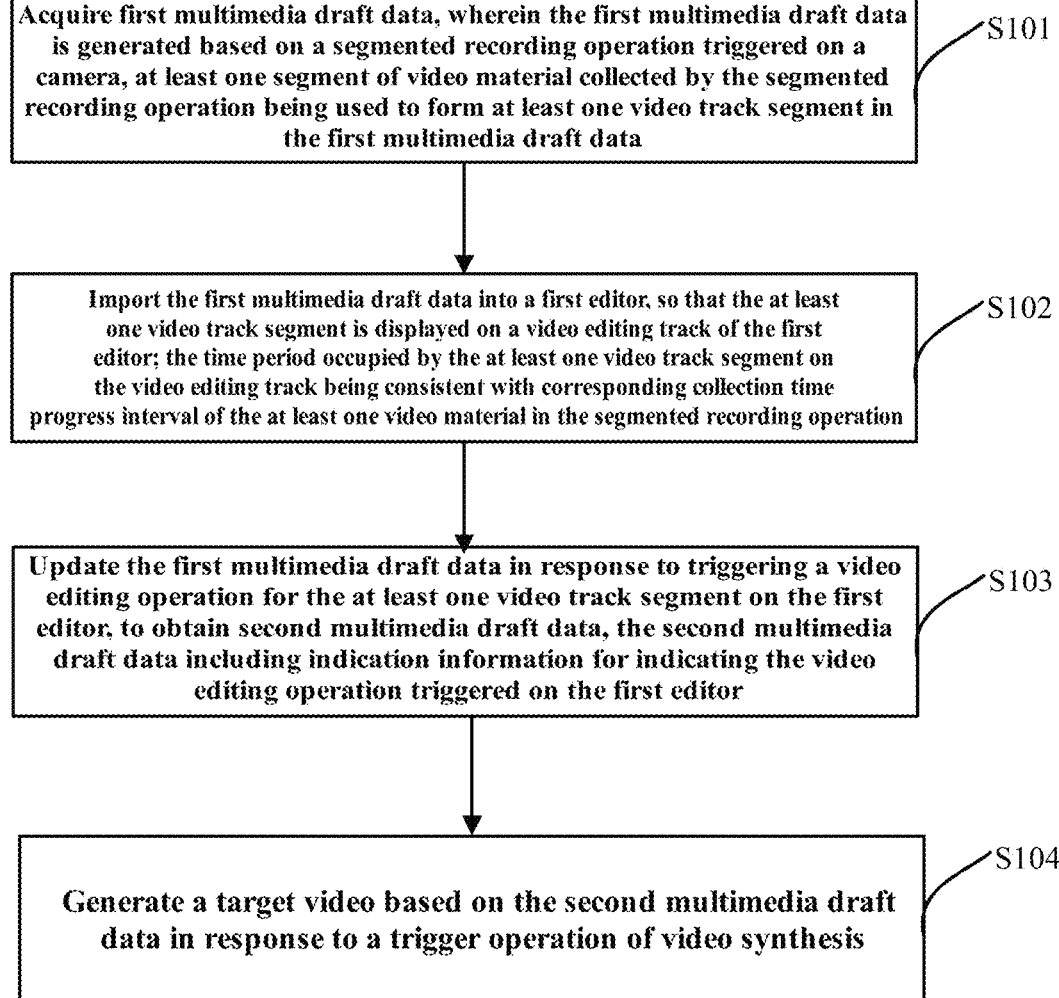

Acquire first multimedia draft data, wherein the first multimedia draft data is generated based on a segmented recording operation triggered on a camera, at least one segment of video material collected by the segmented recording operation being used to form at least one video track segment in the first multimedia draft data    S101

Import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation    S102

Update the first multimedia draft data in response to triggering a video editing operation for the at least one video track segment on the first editor, to obtain second multimedia draft data, the second multimedia draft data including indication information for indicating the video editing operation triggered on the first editor    S103

Generate a target video based on the second multimedia draft data in response to a trigger operation of video synthesis    S104

METHOD, APPARATUS, DEVICE, STORAGE MEDIUM AND PROGRAM PRODUCT FOR PROCESSING MULTIMEDIA DATA

CROSS-REFERENCE TO RELATED APPLICATIONS

The present application is a continuation of U.S. application Ser. No. 18/396,140, filed Dec. 26, 2023, which is a continuation of PCT International Application No. PCT// CN2023/103070, filed Jun. 28, 2023, which is based on and claims priority of China Patent Application No. 202210772811.8, filed on Jun. 30, 2022, the disclosures of which are hereby incorporated herein in their entireties.

TECHNICAL FIELD

The present disclosure relates to the field of video processing technology, and in particular, to a method, apparatus, device, storage medium and program product for processing multimedia data.

BACKGROUND

Video recording products currently available on the market can support either continuous video recording or segmented video recording. Segmented video recording refers to recording multiple video segments in stages during the recording process, and eventually obtaining a complete video including multiple video segments.

SUMMARY

According to some embodiments of the present disclosure, in a first aspect, an embodiment of the present disclosure provides a method for processing multimedia data, comprising:

acquiring first multimedia draft data, wherein the first multimedia draft data is generated based on a segmented recording operation triggered on a camera, at least one segment of video material collected by the segmented recording operation being used to form at least one video track segment in the first multimedia draft data;

importing the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation;

updating the first multimedia draft data in response to triggering a video editing operation for the at least one video track segment on the first editor, to obtain second multimedia draft data, the second multimedia draft data including indication information for indicating the video editing operation triggered on the first editor; and generating a target video based on the second multimedia draft data in response to a trigger operation of video synthesis.

In a second aspect, an embodiment of the present disclosure provides an apparatus for processing multimedia data, comprising:

a first draft data acquisition module configured to acquire first multimedia draft data, wherein the first multimedia draft data is generated based on a segmented recording operation triggered on a camera, at least one segment of video material collected by the segmented recording operation being used to form at least one video track segment in the first multimedia draft data;

a first draft data import module configured to import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation;

a first draft data update module configured to update the first multimedia draft data in response to triggering a video editing operation for the at least one video track segment on the first editor, to obtain second multimedia draft data, the second multimedia draft data including indication information for indicating the video editing operation triggered on the first editor; and a target video generation module configured to generate a target video based on the second multimedia draft data in response to a trigger operation of video synthesis.

In a third aspect, an embodiment of the present disclosure provides an electronic device, the electronic device comprising:

one or more processors;

a storage for storing one or more programs;

when executed by the one or more processors, the one or more programs cause the one or more processors to implement the method for processing multimedia data of any one of the first aspect as described above.

In a fourth aspect, an embodiment of the present disclosure provides a computer-readable storage medium having a computer program stored thereon, which, when executed by a processor, implements the method for processing multimedia data of any one of the first aspect as described above.

In a fifth aspect, an embodiment of the present disclosure provides a computer program product including a computer program or an instruction, which, when executed by a processor, implements the method for processing multimedia data of any one of the first aspect as described above.

Embodiments of the present disclosure provide a method, apparatus, device, storage medium and program product for processing multimedia data. The method comprises: acquiring first multimedia draft data, wherein the first multimedia draft data is generated based on a segmented recording operation triggered on a camera, at least one segment of video material collected by the segmented recording operation being used to form at least one video track segment in the first multimedia draft data; importing the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation; updating the first multimedia draft data in response to triggering a video editing operation for at least one video track segment on the first editor, to obtain second multimedia draft data, the second multimedia draft data including indication information for indicating the video editing operation triggered on the first editor; and generating a target video base on the second multimedia draft data in response to a trigger operation of video synthesis.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale.

FIG. 1 shows an architecture diagram of a multimedia data processing scenario provided by an embodiment of the present disclosure;

FIG. 2 is a schematic flowchart of a method for processing multimedia data in an embodiment of the present disclosure;

DETAILED DESCRIPTION

Figure 3:
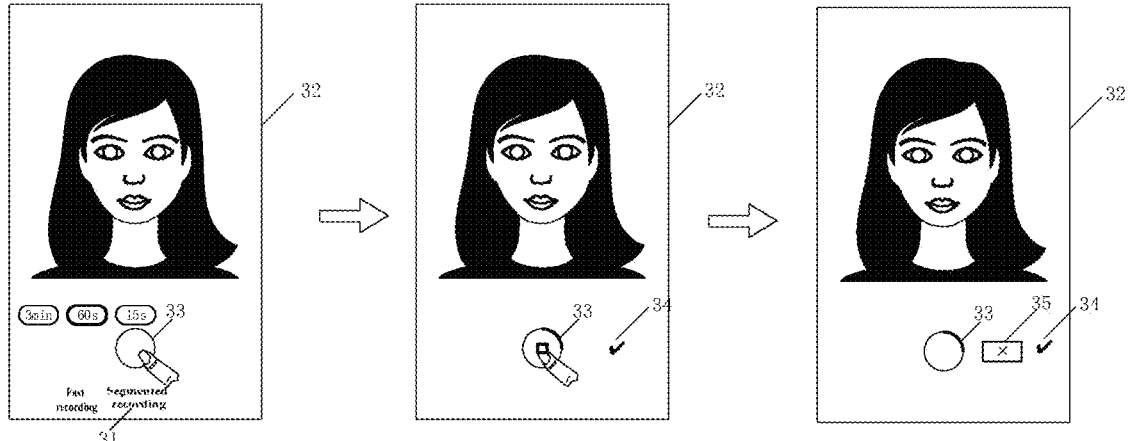
FIG. 3 is a schematic flowchart of a segmented recording operation in an embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

Before further describing embodiments of the present disclosure in detail, the nouns and terms involved in the embodiments of the present disclosure will be explained.

The nouns and terms involved in the embodiments of the present disclosure are applicable to the following explanations.

Client—an application running in a terminal to provide various services, such as a video editing client, a video recording client, etc.

In response to—is used to represent conditions or states on which the performed operations depend. When the dependent conditions or states are met, the one or more operations performed can be in real time or with a set delay; unless otherwise indicated, there is no restriction on the order in which the multiple performed operations are performed.

Video recording products currently available on the market can support either continuous video recording or segmented video recording. Segmented video recording refers to recording multiple video segments in stages during the recording process, and eventually obtaining a complete video including multiple video segments.

In existing solutions for segmented video recording, during the process of segmented video recording, or after the segmented video recording is completed and a complete video is obtained, simple editing operations can be performed on the recorded video, for example: adding stickers, adding beautification function, adding filters, etc. Currently, only simple editing operations can be performed on video segments obtained by segmented recording, resulting in low quality of the target video and poor user experience.

In order to solve the above technical problems, embodiments of the present disclosure provide a method, apparatus, device, storage medium and program product for processing multimedia data, which performs video editing operations on one or more video track segments obtained by segmented recording to improve video quality, and improve user experience.

FIG. 1 shows an architectural diagram of a multimedia data processing scenario provided by an embodiment of the present disclosure.

As shown in FIG. 1, the architecture diagram may include at least one electronic device 101 on the client side and at least one server 102 on the server side. The electronic device 101 can establish a connection and exchange information with the server 102 through a network protocol such as Hyper Text Transfer Protocol over Secure Socket Layer (HTTPS). Wherein, the electronic device may be a mobile terminal, a fixed terminal or a portable terminal, such as a mobile phone, a site, a unit, a device, a multimedia computer, a multimedia tablet, an Internet node, a communicator, a desktop computer, a laptop computer, a notebook computer, a netbook computer, a tablet computer, a Personal Communications System (PCS) device, a personal navigation device, a Personal Digital Assistant (PDA), an audio/video player, a digital camera/camcorder, a positioning device, a television receiver, a radio broadcast receiver, an e-book device, a gaming device, or any combination thereof, including accessories and peripherals for these devices or any combination thereof. The server may be a physical server or a cloud server, and the server may be one server or a cluster of servers.

In an embodiment of the present disclosure, in order to reduce the cost in time to produce videos and improve the quality of the produced videos, the electronic device 101 may receive an acquisition request from a user for first multimedia draft data. After the electronic device 101 receives the acquisition request, it may acquire the first multimedia draft data, and will import the first multimedia draft data into a first editor, so that a video track segment is displayed on a video editing track of the first editor in the electronic device 101; meanwhile, in response to the user triggering a video editing operation for the video track segment on the first editor, the electronic device 101 updates the first multimedia draft data to obtain second multimedia draft data. After the video editing operation is completed, the electronic device 101 generates a target video based on the second multimedia draft data in response to a trigger operation of video synthesis by the user. It can be seen that by performing video editing operations on one or more video track segments obtained by segmented recording, the video quality and user experience can be improved.

Optionally, based on the above architecture, the electronic device 101 may, after receiving the acquisition request from the user for the first multimedia draft data, send the acquisition request carrying the multimedia draft data with a draft data identifier to the server 102. After receiving the acquisition request carrying the multimedia draft data with the draft data identifier sent by the electronic device 101, the server 102 may acquire first multimedia draft data in response to the acquisition request, send the first multimedia draft data to the electronic device 101, so that the electronic device 101 may import the first multimedia draft data into a first editor and display a video track segment on a video editing track of the first editor, and meanwhile, in response to the user triggering a video editing operation for the video track segment on the first editor, the electronic device 101 updates the first multimedia draft data to obtain second multimedia draft data. After the video editing operation is completed, the electronic device 101 generates a target video based on the second multimedia draft data in response to a trigger operation of video synthesis by the user. So as to further improve the quality of produced videos and reduce the data processing volume of the electronic device 101.

The method for processing multimedia data proposed in the embodiment of the present application will be introduced in detail below with reference to the accompanying drawings.

FIG. 2 is a flowchart of a method for processing multimedia data in an embodiment of the present disclosure. The embodiment can be applied to the situation of editing multiple video track segments obtained by segmented recording. The method may be executed by an apparatus for processing multimedia data, which may be implemented in the form of software and/or hardware, and the method for processing multimedia data may be applied to the electronic device described in FIG. 1.

As shown in FIG. 2, the method for processing multimedia data provided by the embodiment of the present disclosure mainly includes steps S101-S104.

S101. Acquire first multimedia draft data, wherein the first multimedia draft data is generated based on a segmented recording operation triggered on a camera, at least one segment of video material collected by the segmented recording operation being used to form at least one video track segment in the first multimedia draft data.

Wherein, the multimedia draft data in the embodiment of the disclosure may include video data, audio data, image data, etc., and the method for processing multimedia data provided by the embodiment of the disclosure may be applied to editing video data, audio data, image data, etc. To facilitate understanding, the embodiment of the present disclosure will be introduced with a scenario applied to video data editing.

In one implementation of the present disclosure, first multimedia draft data is generated based on a segmented recording operation triggered on a camera. Wherein, the camera may refer to a component used for recording in a video recording client running in the electronic device 101, which may include a snapshot mode, a segmented recording mode, etc.

In this embodiment, the segmented recording mode refers to recording multiple video materials in stages during the recording process, and eventually obtaining a complete video including multiple video materials. During the segmented recording process, every time the user pauses the recording operation (for example, clicking the pause recording button in the recording interface), the recording process can be controlled to pause and a piece of video material is generated. That is, since the last paused recording operation, if the user conducted a resuming recording operation (for example, clicking resuming recording button in the recording interface), a piece of video material is generated from the video recorded by the device from the moment when the recording operation was resumed to the moment when this time the recording operation is paused.

In one implementation of the present disclosure, as shown in FIG. 3, in response to a trigger operation on a segmented recording entry control 31 in a camera, a segmented recording page 32 is displayed in the camera, wherein the segmented recording page 32 includes a preview screen collected by the camera. The segmented recording page 32 further includes at least three video duration selection controls, for example: 3 min, 60 s, 15 s, where the video duration is the duration of a target video after synthesizing multiple video materials. Further, the segmented recording page 32 further includes a recording control 33. In response to a trigger operation of the recording control 33, video recording begins, and a collection time progress interval corresponding to the video material is displayed at the periphery of the recording control 33, and a recording completion control 34 is displayed in the segmented recording page 32. During the video recording process, if a trigger operation on the recording control 33 is responded to, the recording will be paused and the recording of the video material of this segment will be completed. At this time, the segmented recording page 32 displays a video material deletion control 35. If a trigger operation on the video material deletion control 35 is responded to, the most recently recorded video material may be deleted. In response to a trigger operation on the recording completion control 34, the collection of the first multimedia draft data is completed.

It should be noted that in the embodiment of the present disclosure, only the segmented recording method is described. In this embodiment, the specific method for segmented video recording is not limited.

In one implementation of the present disclosure, in response to a trigger operation on the recording completion control 34, the collection and saving of the first multimedia draft data is completed. Wherein, the first multimedia draft data may be stored locally or in a server corresponding to the client, which is not specifically limited in the embodiment of the present disclosure.

In an embodiment of the present disclosure, acquiring first multimedia draft data can be understood as acquiring first multimedia draft data collected after above segmented recording operation, and can also be understood as acquiring the stored first multimedia data.

Figure 4:
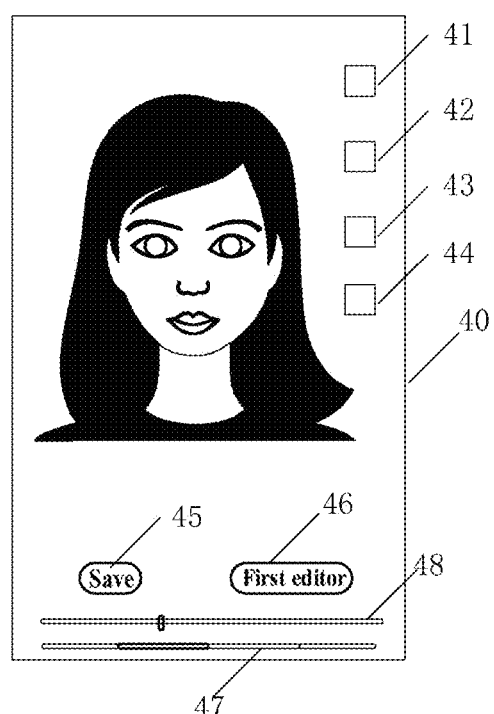
FIG. 4 is a schematic page diagram of a second editor in an embodiment of the present disclosure.

In one implementation of the present disclosure, in response to a trigger operation on a recording completion control in a camera by a user, jump to an editing page 40 of a second editor; as shown in FIG. 4, in the editing page 40 of the second editor, there are displayed multiple editing controls, which may include a segment adjustment control 41, a subtitle adding control 42, an audio adding control 43, and a text adding control 44. The second editor further includes: a video segment saving control 45 and a first editor entry control 46.

Furthermore, with a video playback progress bar 48 on the editing page 40, it is possible to view video playback progress, and perform fast forward or rewind operations. With a video track segment identifier on the editing page 40, it is possible to view which video track segment is played currently.

In an embodiment of the present disclosure, in response to a trigger operation on the segment adjustment control 41, it enters a segment adjustment page, in which, by selecting a first video material by default, it is possible to perform editing operations on the first video material, for example, adjusting playback speed, volume, whether to rerecord, replacing one of the frames, deleting a certain frame, etc. Any of the above editing operations can be performed on each video material. After completing multi-segment splicing, it returns to the editing page 40.

In an embodiment of the present disclosure, in response to a trigger operation on the subtitle adding control 42, it enters a subtitle adding page, in which the recognition and editing of subtitle functions are in the same panel, and the editing panel is multi-track; entering the subtitle adding page starts recognition of speech recognition, and after the recognition is successful, a subtitle editing panel is displayed, in which any subtitle can be selected and editing operations such as batch editing, editing, copying, deleting and so on can be performed. After subtitle editing, it returns to the editing page 40.

In an embodiment of the present disclosure, in response to a trigger operation on the audio adding control 43, it enters an audio adding page. The creation and editing of the audio recording function are in the same page, which is multi-track; when entering the audio adding page, audio recording track is empty by default; clicking or long pressing an audio recording button starts audio recording and generates a audio recording track; when the audio recording is completed without selecting the audio recording track, it is possible to continue audio recording; by selecting any audio recording track, it is possible to perform editing operations such as volume adjustment, recordings deletion, etc. After audio recording editing is completed, it returns to the editing page 40.

In an embodiment of the present disclosure, in response to a trigger operation on the text adding control 44, it enters a text adding page. The adding panel and the editing panel of the text function is separated from each other, and the editing panel is multi-track; the text adding page is consistent with the simple text adding panel in the terminal, and supports changing text content, style, alignment, font, and color; when entering the text editing panel, the newly added text track is selected by default; it is possible to perform editing operations on the text such as style modification, filling, copying, and deletion. After text editing is completed, it returns to the editing page 40.

In this embodiment, if the second editor is not used to edit the first multimedia draft data and directly responds to a trigger operation on the video segment saving control 45, the first multimedia draft data that has not been simply edited will be saved.

In an embodiment of the present disclosure, acquiring first multimedia draft data can be understood as acquiring first multimedia draft data collected after above segmented recording operation, and can also be understood as acquiring the stored first multimedia data.

In one implementation of the present disclosure, a draft page is provided in the second editor. The draft page includes multiple videos. In response to a trigger operation on the videos, the first multimedia draft data corresponding to the videos is imported to the second editor.

In one implementation of the present disclosure, the camera, the second editor and the first editor are in the same client, that is, they are components that implement different functions in the same client. The camera and the second editor are in the first client, and the first editor is in the second client.

In one implementation of the present disclosure, the second editor includes a view model that can support editing, and the view model that can support editing is used to receive a video editing operation triggered on the second editor.

In an embodiment of the present disclosure, the recording page in the camera and the editing page in the second editor are two pages communicating data with each other. The recording page supports the updating and saving of multimedia draft data. The editing page supports the playback and saving of multimedia draft data drafts. The recording page and editing page are two independent fragments. Specifically, relying on the original recording activity component, draft editing is encapsulated (SessiongManager) among ActivityViewModel: EditSupportViewModel, to facilitate communication between the recording page and the editing page. The recording page operates the draft through EditSupportViewModel.

In one implementation of the present disclosure, the camera is registered in a first Activity component, and the second editor is registered in a second Activity component.

In an embodiment of the present disclosure, the camera and the second editor are registered in two independent Activity components respectively. The second Activity component bears the WrapperPreviewrFragment.

In one implementation of the present disclosure, the first Activity component includes a view model that can support drafts, and the view model that can support drafts is used to encapsulate at least one collected video material into first multimedia draft data.

Since the camera only needs to save the draft logic, and no editing related operations are currently required, DraftManager is used alone to manage the draft generation processing of the recording page. With the draft-supported view model (DraftSupportViewModel) encapsulation, it is possible to implement the saving of multimedia draft data.

In one implementation of the present disclosure, the video editing operation triggered on the second editor is a session editing operation, and the triggered video editing operation is encapsulated and managed on the second editor through the view model that can support editing.

In response to a trigger operation on the recording completion control in the camera, jump to the second Activity component, directly transfer recording-related information to the second Activity component, and WrapperPreviewrFragment generates session editing according to a packaging page.

In one implementation of the present disclosure, the first Activity component is draft save control; the method further comprises: in response to triggering the draft save control in the camera, causing the camera to save the collected video material in the form of a draft, obtaining the first multimedia draft data.

In one implementation of the present disclosure, when returning to the camera, communication is returned through startActivityForResult, and the recording page returns to the recording state.

PreviewWapperFragment uses EditoSupportViewModel to encapsulate sessionManager to manage the preview and saving of the entire draft. The draft association with the recording page is associated with the draft id.

S102. Import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation.

Wherein, as it can be seen from the expressions in the above embodiments, during the segmented recording operation, after the recording operation is triggered, recording starts, and after the pause operation is triggered, the first video material is collected. The collection time interval corresponding to the first video material is the time period from the triggering of the recording operation to the triggering of the pause operation. After the recording operation is triggered again, the next video material will be recorded following the previous video material until the pause operation is triggered again and the second video material is collected. The collection time interval corresponding to the first video material is the time period from the triggering of the recording operation again to the triggering of the pause operation again. Wherein, the collection time progress interval corresponding to each video material may be the same or different, which is not specifically limited in the embodiments of the present disclosure.

As shown in FIG. 3, after the collection of one video material is completed, the collection time interval corresponding to the video material is displayed in the form of a progress bar around the recording control 33.

In an embodiment of the present disclosure, the time period occupied by a video track segment on the video editing track is consistent with the corresponding collection time progress interval of the video material in the segmented recording operation. For example: if the corresponding collection time progress interval of the first video material in the segmented recording operation is 0 to 10 seconds, the time period occupied by the first video track segment generated by the first video material on the video editing track is 0 to 10 seconds; if the corresponding collection time progress interval of the second video material in the segmented recording operation is 11 to 16 seconds, the time period occupied by the second video track segment generated by the second video material on the video editing track is 11 to 16 seconds; and so on, which have one-to-one correspondence. The total duration of the entire video material is consistent with the total duration of the video editing track.

In one implementation of the present disclosure, in response to triggering a calling operation for the first editor, the acquired first multimedia draft data is imported into the first editor, so that a first video corresponding to the first multimedia draft data is played on the editing page of the first editor, or a cover image corresponding to the first video is displayed. The calling operation for the first editor may be a trigger operation for an interface of the first editor provided in the camera, or may be a trigger operation for an interface of a second editor provided in the camera. Further, complex editing on the first multimedia draft data can be performed in the first editor, or the first multimedia draft data can be directly saved.

In one implementation of the present disclosure, where the camera and the first editor are functional components provided in different clients, an interface of the first editor may be provided in the camera, and a trigger operation on the interface of the first editor is received, in response to triggering a calling operation for the first editor.

In one implementation of the present disclosure, the camera and the second editor are in a first client, and the first editor is in a second client. It further comprises: the second client receiving a call request sent by the first client, the call request being used to request to import the first multimedia draft into the first editor; the second client displaying prompt information corresponding to the call request, and importing the first multimedia draft into the first editor in response to a confirmation operation to the prompt information.

In an embodiment of the present disclosure, where the camera and the first editor are functional components provided in different clients, when the first editor in the second client receives the call request sent by the first client, prompt information is displayed in the first editor; the first multimedia draft data is imported into the first editor in response to a confirmation operation for the prompt information in the first editor.

Wherein, in response to a trigger operation on the first editor entry control of the first client, the first client sends a call request to the second client. The first editor entry control can be provided in the camera or in the second editor, which is not specifically limited in the embodiments of the present disclosure.

The prompt information is used to provide the user with the first multimedia draft data coming from the first client, whether to receive the first multimedia draft data. The confirmation operation for the prompt information refers to the operation of confirming receipt of the first multimedia draft data coming from the first client.

In one implementation of the present disclosure, before importing the first multimedia draft data into the first editor, it further comprises: in the first editor, in response to a confirmation operation for importing a third-party draft, determining a first draft protocol adopted by the first multimedia draft data, the first draft protocol being a draft protocol supported by the second editor; if the first draft protocol is different than a second draft protocol supported by the first editor, the draft protocol adopted by the first multimedia draft data is converted from the first draft protocol to the second draft protocol in accordance with draft protocol conversion rules.

In an embodiment of the present disclosure, since the camera and the first editor are functional components provided in different clients, the draft protocol to which each client applies may be different. In an implementation of the present disclosure, in the first editor, in response to a confirmation operation for importing a third-party draft, a first draft protocol adopted by the first multimedia draft data is determined; wherein the first draft protocol is a draft protocol supported by the camera and the second editor.

If the first draft protocol is different from the second draft protocol supported in the first editor, the draft protocol adopted by the first multimedia draft data is converted from the first draft protocol to the second draft protocol in accordance with preset draft protocol conversion rules, to facilitate subsequent editing operations performed by the first editor on the first multimedia draft data.

S103. Update the first multimedia draft data in response to triggering a video editing operation for the at least one video track segment on the first editor, to obtain second multimedia draft data, the second multimedia draft data including indication information for indicating the video editing operation triggered on the first editor.

Wherein, the indication information includes the time period occupied by the video track segment corresponding to the video editing operation and which interval of which video material each track segment belongs to. Specifically, when importing a draft in a video editing track, the video material and respective editing operations are displayed on the video editing track according to the indication information.

The method of performing video editing operations on video track segments on the first editor is not specifically limited in the embodiments of the present disclosure.

In one implementation of the present disclosure, rerecording instruction operation can be triggered during the process of using the first editor to perform video editing operations on a video track segment, or during the process of using the second editor to perform video editing operations on a video track segment, in response to the rerecording instruction operation, it returns to the camera, and rerecord one or more video materials. The process of rerecording video materials mainly comprises: in response to a rerecord instruction operation triggered on the video editing track for a target video track segment, displaying a rerecord interface for the first multimedia draft data in the camera; the at least one video track segment including a target video track segment, the target video material in the at least one video materials being used to form the target video track; in the rerecording interface, other video materials other than the target video material in the at least one video materials being restored to corresponding collection time progress intervals in the segmented recording operation, corresponding target collection time progress area of the target video material in the segmented recording operation is vacant; in response to a rerecording operation of the target collection time progress area on the segmented recording interface, acquiring a rerecorded video material; by replacing the target video material with the rerecorded video material in the at least one video materials, updating the first multimedia draft data so that the video material used to form the target video track segment is replaced from the target video material with the rerecorded video material; and importing the updated first multimedia draft data into the first editor.

In an embodiment of the present disclosure, during the video editing process, by triggering the rerecording instruction operation, rerecording of the video material is realized, so that the user can rerecord unsatisfactory video materials at any time.

S104. Generate a target video based on the second multimedia draft data in response to a trigger operation of video synthesis.

In an embodiment of the present disclosure, the trigger operation of video synthesis may refer to a triggering operation on an export control in a page. Wherein, the export method can be to save a target video locally, or to share it to other video sharing platforms or websites. No specific limitations will be made in the embodiments of the disclosure.

The present disclosure relates to a method, apparatus, device, storage medium and program product for processing multimedia data, comprising: acquiring first multimedia draft data, wherein the first multimedia draft data is gener-ated based on a segmented recording operation, video materials collected by the segmented recording operation being used to form video track segments in the first multimedia draft data; importing the first multimedia draft data into a first editor, so that the video track segments are displayed on a video editing track of the first editor; updating the first multimedia draft data in response to triggering a video editing operation for the video track segments on the first editor, to obtain second multimedia draft data; and generating a target video based on the second multimedia draft data in response to a trigger operation of video synthesis. The embodiments of the present disclosure perform video editing operations on one or more video track segments obtained by segmented recording to improve video quality and user experience.

Figure 5:
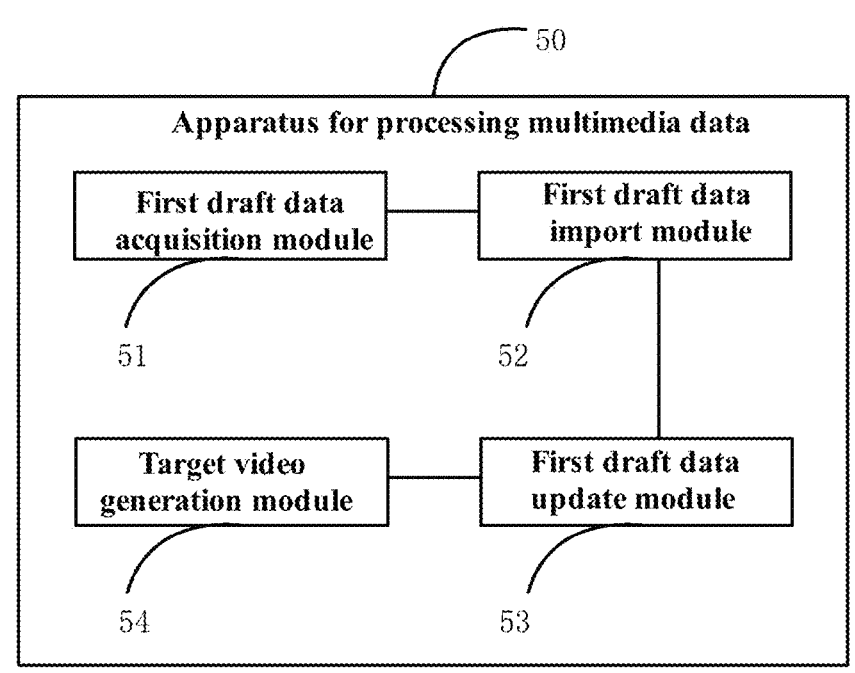
FIG. 5 is a schematic structural diagram of an apparatus for processing multimedia data in an embodiment of the present disclosure.

FIG. 5 is a flowchart of an apparatus for processing multimedia data in an embodiment of the present disclosure. The embodiment can be applied to the situation of editing multiple video track segments obtained by segmented recording. The apparatus for processing multimedia data may be implemented in the form of software and/or hardware, and the method for processing multimedia data may be applied to the electronic device described in FIG. 1.

As shown in FIG. 5, an apparatus for processing multimedia data 50 provided by an embodiment of the present disclosure mainly comprises: a first draft data acquisition module 51, a first draft data import module 52, a first draft data update module 53 and a target video generation module 54.

Wherein, the first draft data acquisition module 51 is configured to acquire first multimedia draft data, wherein the first multimedia draft data is generated based on a segmented recording operation triggered on a camera, at least one segment of video material collected by the segmented recording operation being used to form at least one video track segment in the first multimedia draft data;

The first draft data import module 52 is configured to import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation;

The first draft data update module 53 is configured to update the first multimedia draft data in response to triggering a video editing operation for the at least one video track segment on the first editor, to obtain second multimedia draft data, the second multimedia draft data including indication information for indicating the video editing operation triggered on the first editor;

The target video generation module 54 is configured to generate a target video based on the second multimedia draft data in response to a trigger operation of video synthesis.

In one implementation of the present disclosure, the first multimedia draft data is generated based on a segmented recording operation triggered on a camera and a video editing operation triggered on a second editor, and the first multimedia draft data includes at least one segment of video material collected based on the segmented recording operation and indication information used to indicate the video editing operation triggered on the second editor.

In one implementation of the present disclosure, the number of types of video editing operations that can be triggered on the second editor is less than the number of types of video editing operations that can be triggered on the first editor.

In one implementation of the present disclosure, the second editor includes a view model that can support editing, and the view model that can support editing is used to receive a video editing operation triggered on the second editor.

In one implementation of the present disclosure, the camera and the second editor are in a first client, and the first editor is in a second client. The apparatus further comprises: a call request receiving module configured for the second client to receive a call request sent by the first client, the call request being used to request to import the first multimedia draft into the first editor; a first draft data import module 52, which is further configured for the second client to display prompt information corresponding to the call request, and import the first multimedia draft data into the first editor in response to a confirmation operation to the prompt information.

In one implementation of the present disclosure, the first draft data import module 52 is further configured to, before importing the first multimedia draft data in the first editor, determine a first draft protocol adopted by the first multimedia draft data in response to a confirmation operation for importing a third-party draft in the first editor, the first draft protocol being a draft protocol supported by the second editor; if the first draft protocol is different than a second draft protocol supported by the first editor, converting the draft protocol adopted by the first multimedia draft data from the first draft protocol to the second draft protocol in accordance with draft protocol conversion rules.

In one implementation of the present disclosure, the camera is registered in a first Activity component, and the second editor is registered in a second Activity component.

In one implementation of the present disclosure, the first Activity component includes a view model that can support drafts, and the view model that can support drafts is used to encapsulate at least one collected video material into first multimedia draft data.

In one implementation of the present disclosure, the video editing operation triggered on the second editor is a session editing operation, and the triggered video editing operation is encapsulated and managed on the second editor through the view model that can support editing.

In one implementation of the present disclosure, it further comprises: a rerecording operation triggering module configured to, in response to a rerecord instruction operation triggered on the video editing track for a target video track segment, display a rerecord interface for the first multimedia draft data in the camera; the at least one video track segment including a target video track segment, the target video material in the at least one video materials being used to form the target video track; in the rerecording interface, other video materials other than the target video material in the at least one video materials being restored to corresponding collection time progress intervals in the segmented recording operation, corresponding target collection time progress area of the target video material in the segmented recording operation is vacant; a rerecorded material acquisition module configured to acquire a rerecorded video material in response to a rerecording operation of the target collection time progress area on the segmented recording interface; a video material replacement module configured to update the first multimedia draft data by replacing the target video material with the rerecorded video material in the at least one video materials so that the video material used to form the target video track segment is replaced from the target video material with the rerecorded video material;

and a first draft data import module, which is further configured to import the updated first multimedia draft data into the first editor.

The apparatus for processing multimedia data provided by the embodiments of the present disclosure can execute the steps performed in the method for processing multimedia data provided by the method embodiments of the present disclosure and specific execution steps and beneficial effects will not be described here again.

Figure 6:
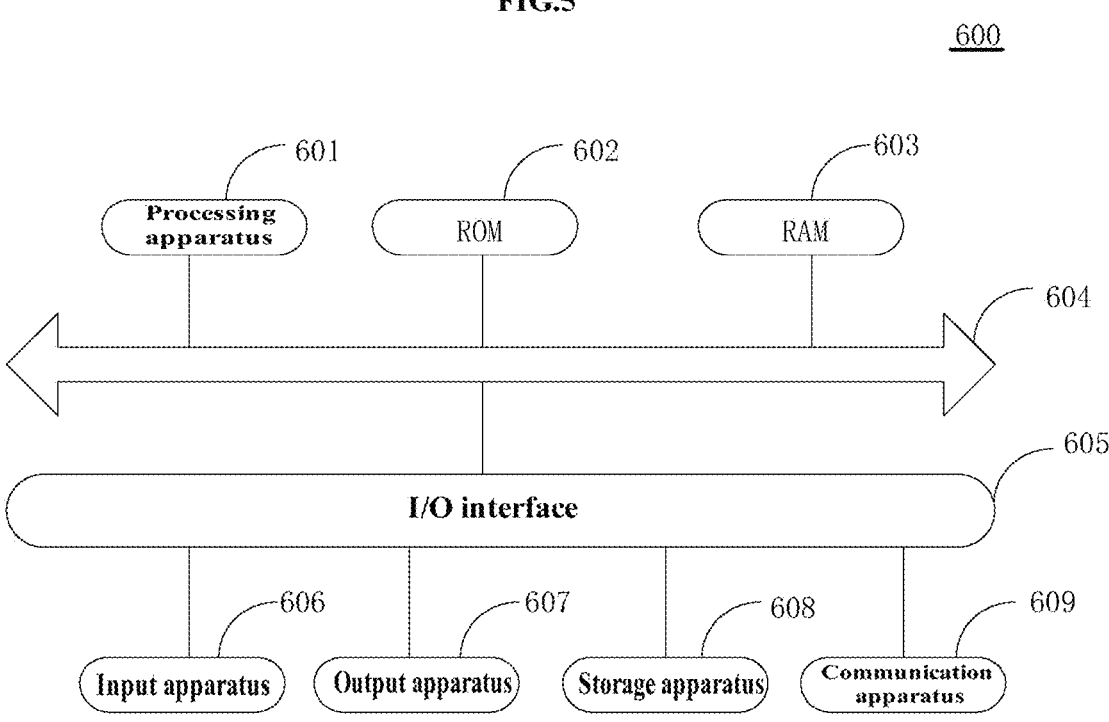
FIG. 6 is a schematic structural diagram of an electronic device in an embodiment of the present disclosure.

FIG. 6 is a schematic structural diagram of an electronic device in an embodiment of the present disclosure. Referring specifically to FIG. 6 below, it shows a schematic structural diagram suitable for implementing an electronic device 600 in an embodiment of the present disclosure. The electronic device 600 in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), a wearable terminal device, etc. and a fixed terminal such as a digital TV, a desktop computer, a smart home appliance, etc. The electronic device shown in FIG. 6 is only one example, and should not bring any limitation to functions and usage scopes of embodiments of the present disclosure.

As shown in FIG. 6, the electronic device 600 may include a processing device (e.g., a central processing unit, a graphics processor, etc.) 601, which can execute various appropriate actions and processes according to a program stored in a read-only memory (ROM) 602 or a program loaded from a storage 608 into a random-access memory (RAM) 603, to implement the method for processing multimedia data according to the embodiments of the present disclosure. In the RAM 603, various programs and data required for the operation of the terminal device 600 are also stored. The processing apparatus 601, ROM 602 and RAM 603 are connected to each other via a bus 604. An input/output (I/O) interface 605 is also connected to bus 604.

Generally, the following apparatus may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator etc.; a storage apparatus 608 including, for example, a magnetic tape, a hard disk, etc.; and a communication apparatus 609. The communication apparatus 609 may allow the terminal device 600 to perform wireless or wired communication with other devices to exchange data. Although FIG. 6 shows the terminal device 600 having various apparatus, it should be understood that it is not required to implement or provide all of the illustrated apparatus. More or fewer apparatus may be implemented or provided alternatively.

In particular, according to the embodiments of the present disclosure, the processes described above with reference to the flowcharts may be implemented as computer software programs. For example, an embodiment of the present disclosure includes a computer program product, which includes a computer program carried on a non-transitory computer-readable medium, and the computer program contains program code for executing the method shown in the flowchart, thereby implementing the above method for processing multimedia data. In such embodiments, the computer program may be downloaded and installed from the network via the communication apparatus 609, or installed from storage apparatus 608, or installed from the ROM 602.

When the computer program is executed by the processing apparatus 601, above functions defined in the methods of the embodiment of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic devices.

The above computer-readable medium carries one or more programs, which, when executed by the terminal device, cause the terminal device to: acquire first multimedia draft data, wherein the first multimedia draft data is generated based on a segmented recording operation triggered on a camera, at least one segment of video material collected by the segmented recording operation being used to form at least one video track segment in the first multimedia draft data; import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation; update the first multimedia draft data in response to triggering a video editing operation for the at least one video track segment on the first editor, to obtain second multimedia draft data, the second multimedia draft data including indication information for indicating the video editing operation triggered on the first editor; and generate a target video based on the second multimedia draft data in response to a trigger operation of video synthesis.

Optionally, when one or more of the above programs are executed by the terminal device, the terminal device may also perform other steps described in the above embodiments.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a method for processing multimedia data, comprising: acquiring first multimedia draft data, wherein the first multimedia draft data is generated based on a segmented recording operation triggered on a camera, at least one segment of video material collected by the segmented recording operation being used to form at least one video track segment in the first multimedia draft data; importing the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation; updating the first multimedia draft data in response to triggering a video editing operation for the at least one video track segment on the first editor, to obtain second multimedia draft data, the second multimedia draft data including indication information for indicating the video editing operation triggered on the first editor; and generating a target video based on the second multimedia draft data in response to a trigger operation of video synthesis.

According to one or more embodiments of the present disclosure, the present disclosure provides a method for processing multimedia data, wherein the first multimedia draft data is generated based on the segmented recording operation triggered on the camera and the video editing operation triggered on the second editor, the first multimedia draft data including at least one segment of video material collected based on the segmented recording operation and indication information for indicating the video editing operation triggered on the second editor.

According to one or more embodiments of the present disclosure, the present disclosure provides a method for processing multimedia data, wherein the number of types of video editing operations that can be triggered on the second editor is less than the number of types of video editing operations that can be triggered on the first editor.

According to one or more embodiments of the present disclosure, the present disclosure provides a method for processing multimedia data, wherein the second editor includes a view model that can support editing, and the view model that can support editing is used to receive a video editing operation triggered on the second editor.

According to one or more embodiments of the present disclosure, the present disclosure provides a method for processing multimedia data, wherein the camera and the second editor are in a first client, and the first editor is in a second client. The method further comprises: the second client receiving a call request sent by the first client, the call request being used to request to import the first multimedia draft into the first editor; the second client displaying prompt information corresponding to the call request, and importing the first multimedia draft data into the first editor in response to a confirmation operation to the prompt information.

According to one or more embodiments of the present disclosure, the present disclosure provides a method for processing multimedia data, wherein, before importing the first multimedia draft data into the first editor, the method further comprises: in the first editor, in response to a confirmation operation for importing a third-party draft, determining a first draft protocol adopted by the first multimedia draft data, the first draft protocol being a draft protocol supported by the second editor; if the first draft protocol is different than a second draft protocol supported by the first editor, the draft protocol adopted by the first multimedia draft data is converted from the first draft protocol to the second draft protocol in accordance with draft protocol conversion rules.

According to one or more embodiments of the present disclosure, the present disclosure provides a method for processing multimedia data, wherein the camera is registered in a first Activity component, and the second editor is registered in a second Activity component.

According to one or more embodiments of the present disclosure, the present disclosure provides a method for processing multimedia data, wherein the first Activity component includes a view model that can support drafts, and the view model that can support drafts is used to encapsulate at least one collected video material into first multimedia draft data.

According to one or more embodiments of the present disclosure, the present disclosure provides a method for processing multimedia data, wherein the video editing operation triggered on the second editor is a session editing operation, and the triggered video editing operation is encapsulated and managed on the second editor through the view model that can support editing.

According to one or more embodiments of the present disclosure, the present disclosure provides a method for processing multimedia data, wherein, the method further comprises: in response to a rerecord instruction operation triggered on the video editing track for a target video track segment, displaying a rerecord interface for the first multimedia draft data in the camera; the at least one video track segment including a target video track segment, the target video material in the at least one video materials being used to form the target video track; in the rerecording interface, other video materials other than the target video material in the at least one video materials being restored to corresponding collection time progress intervals in the segmented recording operation, corresponding target collection time progress area of the target video material in the segmented recording operation is vacant; in response to a rerecording operation of the target collection time progress area on the segmented recording interface, acquiring a rerecorded video material; by replacing the target video material with the rerecorded video material in the at least one video materials, updating the first multimedia draft data so that the video material used to form the target video track segment is replaced from the target video material with the rerecorded video material; and importing the updated first multimedia draft data into the first editor.

According to one or more embodiments of the present disclosure, the present disclosure provides an apparatus for processing multimedia data, comprising: a first draft data acquisition module configured to acquire first multimedia draft data, wherein the first multimedia draft data is generated based on a segmented recording operation triggered on a camera, at least one segment of video material collected by the segmented recording operation being used to form at least one video track segment in the first multimedia draft data; a first draft data import module configured to import the first multimedia draft data into a first editor, so that the at least one video track segment is displayed on a video editing track of the first editor; the time period occupied by the at least one video track segment on the video editing track being consistent with corresponding collection time progress interval of the at least one video material in the segmented recording operation; a first draft data update module configured to update the first multimedia draft data in response to triggering a video editing operation for the at least one video track segment on the first editor, to obtain second multimedia draft data, the second multimedia draft data including indication information for indicating the video editing operation triggered on the first editor; and a target video generation module configured to generate a target video based on the second multimedia draft data in response to a trigger operation of video synthesis.

According to one or more embodiments of the present disclosure, the present disclosure provides an apparatus for processing multimedia data, wherein the first multimedia draft data is generated based on a segmented recording operation triggered on a camera and a video editing operation triggered on a second editor, the first multimedia draft data including at least one segment of video material collected based on the segmented recording operation and indication information for indicating the video editing operation triggered on the second editor.

According to one or more embodiments of the present disclosure, the present disclosure provides an apparatus for processing multimedia data, wherein the number of types of video editing operations that can be triggered on the second editor is less than the number of types of video editing operations that can be triggered on the first editor.

According to one or more embodiments of the present disclosure, the present disclosure provides an apparatus for processing multimedia data, wherein the second editor includes a view model that can support editing, and the view model that can support editing is used to receive a video editing operation triggered on the second editor.

According to one or more embodiments of the present disclosure, the present disclosure provides an apparatus for processing multimedia data, wherein the camera and the second editor are in a first client, and the first editor is in a second client. The apparatus further comprises: a call request receiving module configured for the second client to receive a call request sent by the first client, the call request being used to request to import the first multimedia draft into the first editor; a first draft data import module, which is further configured for the second client to display prompt information corresponding to the call request, and import the first multimedia draft data into the first editor in response to a confirmation operation to the prompt information.

According to one or more embodiments of the present disclosure, the present disclosure provides an apparatus for processing multimedia data, wherein the first draft data import module is further configured to, before importing the first multimedia draft data in the first editor, determine a first draft protocol adopted by the first multimedia draft data in response to a confirmation operation for importing a third-party draft in the first editor, the first draft protocol being a draft protocol supported by the second editor; if the first draft protocol is different than a second draft protocol supported by the first editor, converting the draft protocol adopted by the first multimedia draft data from the first draft protocol to the second draft protocol in accordance with draft protocol conversion rules.

According to one or more embodiments of the present disclosure, the present disclosure provides an apparatus for processing multimedia data, wherein the camera is registered in a first Activity component, and the second editor is registered in a second Activity component.

According to one or more embodiments of the present disclosure, the present disclosure provides an apparatus for processing multimedia data, wherein the first Activity component includes a view model that can support drafts, and the view model that can support drafts is used to encapsulate at least one collected video material into first multimedia draft data.

According to one or more embodiments of the present disclosure, the present disclosure provides an apparatus for processing multimedia data, wherein the video editing operation triggered on the second editor is a session editing operation, and the triggered video editing operation is encapsulated and managed on the second editor through the view model that can support editing.

According to one or more embodiments of the present disclosure, the present disclosure provides an apparatus for processing multimedia data, wherein, the apparatus further comprises: a rerecording operation triggering module configured to, in response to a rerecord instruction operation triggered on the video editing track for a target video track segment, display a rerecord interface for the first multimedia draft data in the camera; the at least one video track segment including a target video track segment, the target video material in the at least one video materials being used to form the target video track; in the rerecording interface, other video materials other than the target video material in the at least one video materials being restored to corresponding collection time progress intervals in the segmented recording operation, corresponding target collection time progress area of the target video material in the segmented recording operation is vacant; a rerecorded material acquisition module configured to acquire a rerecorded video material in response to a rerecording operation of the target collection time progress area on the segmented recording interface; a video material replacement module configured to update the first multimedia draft data by replacing the target video material with the rerecorded video material in the at least one video materials so that the video material used to form the target video track segment is replaced from the target video material with the rerecorded video material; and a first draft data import module, which is further configured to import the updated first multimedia draft data into the first editor.

According to one or more embodiments of the present disclosure, the present disclosure provides an electronic device, comprising:

one or more processors;

a memory configured to store one or more programs;

when executed by the one or more processors, the one or more programs cause the one or more processors to implement any of the methods for processing multimedia data provided by present disclosure.

According to one or more embodiments of the present disclosure, the present disclosure provides a computer-readable storage medium having a computer program stored thereon, which, when executed by a processor, implements any of the methods for processing multimedia data provided by the present disclosure.

The embodiments of the present disclosure also provide a computer program product including a computer program or an instruction, which, when executed by a processor, implements the method for processing multimedia data as described above.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A method for processing multimedia data, comprising:
generating first multimedia draft data, wherein the first multimedia draft data is generated based on a segmented recording operation triggered on a camera and a video editing operation triggered on a second editor, at least one segment of video material collected by the segmented recording operation being used to form at least one video segment in the first multimedia draft data;
importing the first multimedia draft data into a first editor, the at least one video segment is displayed on a video editing track of the first editor; the time period occupied by the at least one video segment on the video editing track being consistent with corresponding collection time progress interval of the at least one segment of video material in the segmented recording operation;
updating the first multimedia draft data in response to triggering a video editing operation for the at least one video segment on the first editor, to obtain second multimedia draft data, the second multimedia draft data including indication information for indicating the video editing operation triggered on the first editor; and
generating a target video based on the second multimedia draft data in response to a trigger operation of video synthesis,
wherein the number of types of video editing operations that can be triggered on the second editor is less than the number of types of video editing operations that can be triggered on the first editor.

2. The method according to claim 1, wherein the second editor includes a view model that can support editing, and the view model that can support editing is used to receive a video editing operation triggered on the second editor.

3. The method according to claim 1, wherein the camera and the second editor are in a first client, and the first editor is in a second client, the method further comprising:
the second client receiving a call request sent by the first client, the call request being used to request to import the first multimedia draft into the first editor; and
the second client displaying prompt information corresponding to the call request, and importing the first multimedia draft data into the first editor in response to a confirmation operation to the prompt information.

4. The method according to claim 3, before importing the first multimedia draft data into the first editor, the method further comprising:
in the first editor, in response to a confirmation operation for importing a third-party draft, determining a first draft protocol adopted by the first multimedia draft data, the first draft protocol being a draft protocol supported by the second editor; and
in response to that the first draft protocol is different than a second draft protocol supported by the first editor, the draft protocol adopted by the first multimedia draft data is converted from the first draft protocol to the second draft protocol in accordance with draft protocol conversion rules.

5. The method according to claim 1, wherein the camera is registered in a first Activity component, and the second editor is registered in a second Activity component.

6. The method according to claim 5, wherein the first Activity component includes a view model that can support drafts, and the view model that can support drafts is used to encapsulate at least one collected video material into first multimedia draft data.

7. The method according to claim 5, wherein a video editing operation triggered on the second editor is a session editing operation, and the video editing operation triggered on the second editor is encapsulated and managed on the second editor through the view model that can support editing.

8. The method according to claim 1, the method further comprising:
in response to a rerecord instruction operation triggered on the video editing track for a target video segment, displaying a rerecord interface for the first multimedia draft data in the camera; the at least one video segment including a target video segment, a target video material in the at least one video materials being used to form the target video segment; in the rerecording interface, other video materials other than the target video material in the at least one video materials being restored to corresponding collection time progress intervals in the segmented recording operation, corresponding target collection time progress area of the target video material in the segmented recording operation is vacant;
in response to a rerecording operation of the target collection time progress area on the segmented recording interface, acquiring a rerecorded video material;
by replacing the target video material with the rerecorded video material in the at least one video materials, updating the first multimedia draft data so that the video material used to form the target video segment is replaced from the target video material with the rerecorded video material; and importing the updated first multimedia draft data into the first editor.

9. An electronic device, comprising:
one or more processors; and
a storage for storing one or more programs;
when executed by the one or more processors, the one or more programs cause the one or more processors to implement a method comprising:
generating first multimedia draft data, wherein the first multimedia draft data is generated based on a segmented recording operation triggered on a camera and a video editing operation triggered on a second editor, at least one segment of video material collected by the segmented recording operation being used to form at least one video segment in the first multimedia draft data;
importing the first multimedia draft data into a first editor, the at least one video segment is displayed on a video editing track of the first editor; the time period occupied by the at least one video segment on the video editing track being consistent with corresponding collection time progress interval of the at least one segment of video material in the segmented recording operation;
updating the first multimedia draft data in response to triggering a video editing operation for the at least one video segment on the first editor, to obtain second multimedia draft data, the second multimedia draft data including indication information for indicating the video editing operation triggered on the first editor; and
generating a target video based on the second multimedia draft data in response to a trigger operation of video synthesis,
wherein the number of types of video editing operations that can be triggered on the second editor is less than the number of types of video editing operations that can be triggered on the first editor.

10. The electronic device of claim 9, wherein the second editor includes a view model that can support editing, and the view model that can support editing is used to receive a video editing operation triggered on the second editor.

11. The electronic device of claim 9, wherein the camera is registered in a first Activity component, and the second editor is registered in a second Activity component.

12. The electronic device of claim 9, wherein the method implemented by the one or more processors further comprises:
in response to a rerecord instruction operation triggered on the video editing track for a target video segment, displaying a rerecord interface for the first multimedia draft data in the camera; the at least one video segment including a target video segment, a target video material in the at least one video materials being used to form the target video segment; in the rerecording interface, other video materials other than the target video material in the at least one video materials being restored to corresponding collection time progress intervals in the segmented recording operation, corresponding target collection time progress area of the target video material in the segmented recording operation is vacant;
in response to a rerecording operation of the target collection time progress area on the segmented recording interface, acquiring a rerecorded video material;
by replacing the target video material with the rerecorded video material in the at least one video materials, updating the first multimedia draft data so that the video material used to form the target video segment is replaced from the target video material with the rerecorded video material; and
importing the updated first multimedia draft data into the first editor.

13. A non-transitory computer-readable storage medium having a computer program stored thereon, which, when executed by a processor, implements a method comprising:
generating first multimedia draft data, wherein the first multimedia draft data is generated based on a segmented recording operation triggered on a camera and a video editing operation triggered on a second editor, at least one segment of video material collected by the segmented recording operation being used to form at least one video segment in the first multimedia draft data;
importing the first multimedia draft data into a first editor, the at least one video segment is displayed on a video editing track of the first editor; the time period occupied by the at least one video segment on the video editing track being consistent with corresponding collection time progress interval of the at least one segment of video material in the segmented recording operation;
updating the first multimedia draft data in response to triggering a video editing operation for the at least one video segment on the first editor, to obtain second multimedia draft data, the second multimedia draft data including indication information for indicating the video editing operation triggered on the first editor; and
generating a target video based on the second multimedia draft data in response to a trigger operation of video synthesis,
wherein the number of types of video editing operations that can be triggered on the second editor is less than the number of types of video editing operations that can be triggered on the first editor.

14. The non-transitory computer-readable storage medium of claim 13, wherein the second editor includes a view model that can support editing, and the view model that can support editing is used to receive a video editing operation triggered on the second editor.

15. The non-transitory computer-readable storage medium of claim 13, wherein the camera is registered in a first Activity component, and the second editor is registered in a second Activity component.

16. The non-transitory computer-readable storage medium of claim 13, wherein the method implemented by computer program further comprises:
in response to a rerecord instruction operation triggered on the video editing track for a target video segment, displaying a rerecord interface for the first multimedia draft data in the camera; the at least one video segment including a target video segment, the target video material in the at least one video materials being used to form the target video segment; in the rerecording interface, other video materials other than the target video material in the at least one video materials being restored to corresponding collection time progress intervals in the segmented recording operation, corresponding target collection time progress area of the target video material in the segmented recording operation is vacant;
in response to a rerecording operation of the target collection time progress area on the segmented recording interface, acquiring a rerecorded video material;
by replacing the target video material with the rerecorded video material in the at least one video materials, updating the first multimedia draft data so that the video material used to form the target video segment is replaced from the target video material with the rerecorded video material; and importing the updated first multimedia draft data into the first editor.

* * * * *